(12) United States Patent
Hollatz

(10) Patent No.: US 8,028,084 B2
(45) Date of Patent: Sep. 27, 2011

(54) IP ACD USING BUFFER SERVER

(75) Inventor: Mike Hollatz, Huntley, IL (US)

(73) Assignee: Aspect Software, Inc., Lombard, IL (US)

(*) Notice: Subject to any disclaimer, the term of this patent is extended or adjusted under 35 U.S.C. 154(b) by 1397 days.

(21) Appl. No.: 10/761,012

(22) Filed: Jan. 20, 2004

(65) Prior Publication Data

US 2005/0188110 A1 Aug. 25, 2005

(51) Int. Cl.
*G06F 15/173* (2006.01)
*H04L 12/28* (2006.01)
*H04M 3/00* (2006.01)
*H04M 5/00* (2006.01)

(52) U.S. Cl. ............. 709/238; 379/265.01; 379/265.02; 379/265.13; 370/389

(58) Field of Classification Search .................. 709/238, 709/244; 370/389; 379/265.01, 265.02, 379/265.13
See application file for complete search history.

(56) References Cited

U.S. PATENT DOCUMENTS

| | | |
|---|---|---|
| 5,555,179 A | 9/1996 | Koyama et al. |
| 5,765,033 A | 6/1998 | Miloslavsky |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,570,980 B1 * | 5/2003 | Baruch ................... 379/265.12 |
| 6,732,156 B2 | 5/2004 | Miloslavsky |
| 6,816,912 B1 * | 11/2004 | Borella et al. ............... 709/238 |
| 7,233,980 B1 * | 6/2007 | Holden et al. ............... 709/219 |
| 2002/0141404 A1 * | 10/2002 | Wengrovitz ................. 370/389 |
| 2002/0194378 A1 * | 12/2002 | Foti .............................. 709/246 |
| 2004/0120502 A1 * | 6/2004 | Strathmeyer et al. .... 379/265.01 |
| 2004/0213209 A1 | 10/2004 | O'Connor et al. |
| 2005/0078657 A1 | 4/2005 | Huey |
| 2005/0100008 A1 * | 5/2005 | Miyata et al. ................ 370/389 |

FOREIGN PATENT DOCUMENTS

WO WO 03/073731 A1 4/2003
WO WO 2004/062191 A3 7/2004

* cited by examiner

*Primary Examiner* — Joseph Avellino
*Assistant Examiner* — Jeong S Park
(74) *Attorney, Agent, or Firm* — Husch Blackwell LLP

(57) ABSTRACT

A method and apparatus are provided for routing a call within an automatic contact distributor. The method includes the steps of transferring control of the call to a buffer server, setting up a call connection between an agent of the automatic call distributor and a client of the automatic call distributor through the buffer server, re-addressing SIP messages received by the buffer server from the agent and forwarding the re-addressed SIP messages to the client and re-addressing SIP messages received from the client and forwarding the re-addressed SIP messages to the agent.

27 Claims, 1 Drawing Sheet

IP ACD USING BUFFER SERVER

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers. Typically, calls are directed to a common telephone number and distributed to agents based upon some criteria (e.g., agent idle time).

ACDs may process inbound or outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to handling Internet calls. Further, the standards that are used for processing switched circuit calls within the PSTN cannot be used within the Internet. Accordingly, a need exits for a better method of processing calls that is adaptable to both PSTN and Internet calls.

SUMMARY

A method and apparatus are provided for routing a call within an automatic contact distributor. The method includes the steps of transferring control of the call to a buffer server, setting up a call connection between an agent of the automatic call distributor and a client of the automatic call distributor through the buffer server, re-addressing SIP messages received by the buffer server from the agent and forwarding the re-addressed SIP messages to the client and re-addressing SIP messages received from the client and forwarding the re-addressed SIP messages to the agent.

DETAILED DESCRIPTION OF AN ILLUSTRATED EMBODIMENT

Figure 1:
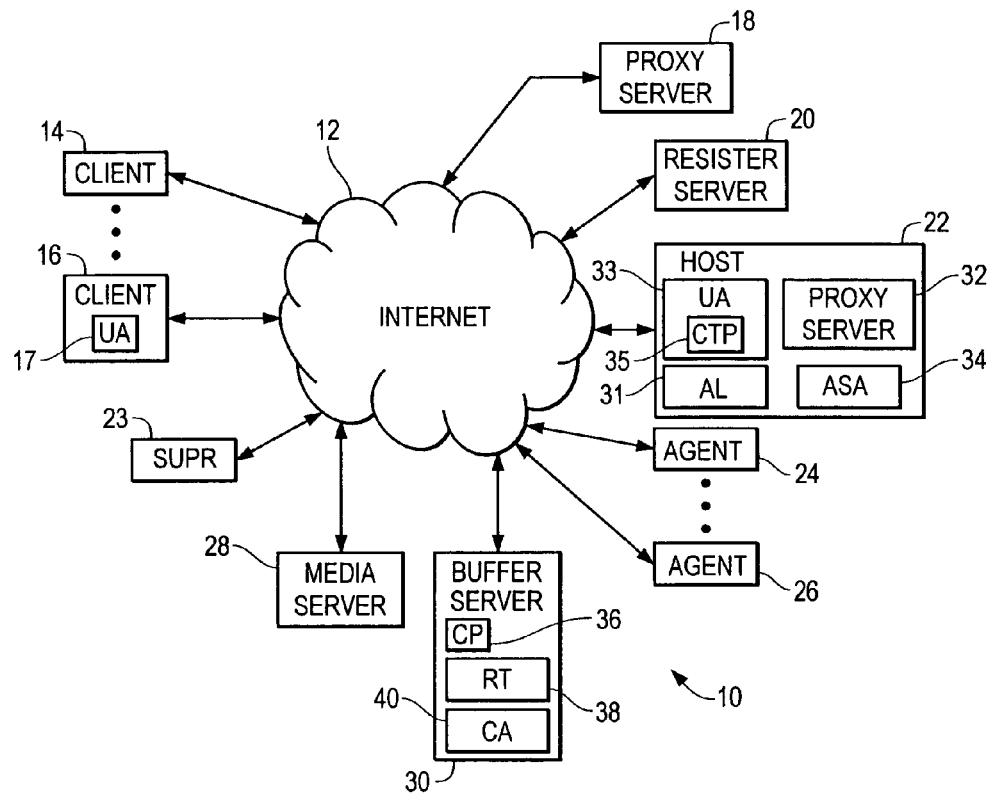
FIG. 1 is a block diagram of an automatic contact processor in accordance with an illustrated embodiment of the invention.

FIG. 1 depicts an automatic contact distributor system 10 using Session Initiation Protocol (SIP) shown in a context of use generally in accordance with an illustrated embodiment of the invention. As shown, the system 10 may receive or place calls through the Internet 12.

The use of a SIP protocol allows two or more participants to establish a session wherein one or more media streams is exchanged with each participant. The media streams may be audio, video or any other combination of Internet-based communication mediums. The simultaneous setup and use of audio and video by the system 10 for one call between two or more parties is one example.

In general, the system 10 may be used by any of a number of different organizations (e.g., commercial, environmental, political, etc.) to advance the agenda of the organization. Access to the contact center 10 may be provided through the Internet under any of a number of different processes. In order to promulgate the agenda of the organization to its clients 14, 16 the organization may publish, by advertising or otherwise, a telephone number or universal resource locator (URL) that identifies a communication path to the organization.

The system 10 may include a host 22 that places and receives calls and that distributes those calls to the agents 24, 26 of the organization. One or more agent selection applications 34 may be provided within the host 22 for detecting calls and for selecting an agent for handling each call.

Calls may be placed to and received from the organization (i.e., from the system 10) using any of a number of different communication devices. For example, one client may place or receive calls through a SIP telephone 14 or personal computer 16 connected directly to the Internet 12 or through an Internet Service Provider (ISP).

For example, to contact the organization, a client may enter a published telephone number of the organization into his SIP telephone 14. Entry of a telephone number into the SIP telephone 14 causes the telephone 14 to compose a number of messages that ultimately result in a call be directed to the organization.

In order to contact the organization, the telephone 14 must first locate a proxy server. To locate a proxy server, the telephone 14 may first perform a DNS SRV query to locate a proxy server 18 (e.g., at prox.com). Upon locating a proxy server, the telephone may compose a SIP INVITE 100 (FIG. 2) that incorporates the entered telephone number and send the packet message to the proxy server 18. As used herein, an INVITE is a SIP message composed in accordance with the Internet Engineering Task Force (IETF) RFC #3261.

The proxy server 18 first identifies and then forwards the INVITE to a Universal Resource Indicator (URI) associated with the entered telephone number. As a first step in forwarding the INVITE 100, the proxy server 18 may send a query to a registration server 20 to identify a URI of the organization. The registration server 20 serves as a registrar for PSTN telephone numbers registered by web entities. Registration with the registration server 20 in this case means registering a URI that corresponds to the registered PSTN telephone number.

Figure 2:
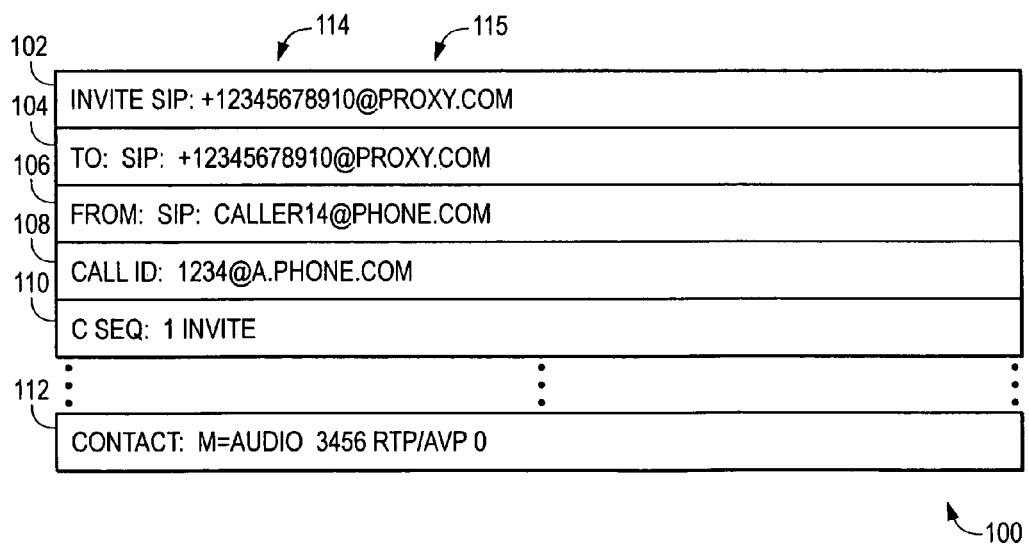
FIG. 2 is a simplified block diagram of an INVITE that may be used by the system of FIG. 1.

The SIP INVITE 100 may have the form shown in FIG. 2. A first line 102 of the INVITE 100 may include a logical URI of the target of the INVITE 100. In the case of a SIP telephone 14, the SIP telephone 14 does not initially have the URI of the call target identified by the telephone number. To solve this problem, the SIP telephone 14 may be programmed to initially direct all INVITEs to the proxy server 18 with the entered telephone number entered as a prefix 114 to a URI identifier (i.e., domain name 115) of the proxy 18.

The To header 104 of the INVITE 100 may identify an intended target of the INVITE 100. At this stage of the example, the content of the To header 104 may be the same as the first line 102.

The From header 106 may be a URI of a source of the call. In this example, the source of the call is the SIP telephone 14 (i.e., "caller14@phone.com").

The Call-ID header 108 may be a call identifier generated by the call source (in this case the SIP telephone 14) for the purposes of message identification. The call identifier may be any unique number provided by the call source 14.

The Cseq header 110 may be a call sequence number. The call sequence number may be incremented for each message exchanged between source and target for purposes of detecting lost messages.

Another header 112 may propose a specific mode of communication to be used during a subsequent communication session. The mode may be proposed and negotiated using Session Description Protocol (SDP), although other mode descriptors could be used.

Upon receipt of the INVITE 100 from the telephone 14, the proxy server 18 may return a processing message "SIP/2.0 100 Trying" to the SIP telephone 14 and proceed to process the INVITE 100. As a first step, the proxy server 18 may forward the prefix 114 within the first line 102 to the registration server 20.

Within the registration server 20, the prefix 114 within the first line 102 may be used as a pointer to identify a location within a lookup table. Within the identified location may be a URI of the registering entity. In this case, the registering entity may be the organization and the URI registered by the entity may be an agent selection application 34 within the host 22. In this example, the host 22 may have a domain name of "host.com" and may have registered the URI of "12345678910@host.com" for use with the registered telephone number.

The prefix "12345678910" within the URI may be used as an identifier to route the INVITE to the application 34 and as an identifier of a call type. In fact, the host 22 may register many different telephone numbers with the registration server 20 where each registration identifies the application 34 and each prefix identifies a different call type to the application 34. Alternatively, the prefixes may be used as a routing identifier to route each call type to a different agent selection application 34.

In order to redirect the INVITE 100 to the host 34, the proxy 24 may insert the registered domain name into the first line 102 of the INVITE 100. Once the first line 102 of the INVITE 100 has been changed to the URI associated with the host 34, the proxy server 18 may forward the INVITE 100 to the host 22.

Within the host 22, a user agent 33 may be provided that receives and identifies each modified INVITE 100. As each INVITE 100 is received, a call typing processor 35 within the user agent 33 compares the prefix 114 of the destination address 102 with a list of registered PSTN telephone numbers to identify those calls that will be directed to agents 24, 26 and to determine a call type of those calls. Once the INVITE 100 is determined as being intended for an agent, the INVITE 100 may be forwarded to the appropriate application 34. The application 34 (operating under call processing language (CPL)) may parse the INVITE 100 to retrieve an identifier of the dialed telephone number and the URI of the caller 12.

The dialed telephone number may be used to identify a subject matter of the call. The URI of the caller 12 may provide information about prior contacts with this caller 12.

Within the application 34, an agent 24, 26 may be selected to handle the call from an agent list 31. The agent list 31 may contain a current list (and universal resource indicators (URIs) or Universal Resource Locators (URLs)) of agents 24, 26 who have signed into the host 22 and are currently available to receive calls. (As is known, a URI is a relative locator and URL is an absolute locator.) Also included within the agent list 31 may be a cross-referenced list of skills (e.g., call types) for which each agent is proficient.

The agent 24, 26 may be selected based upon idle time or upon skill in handling this particular type of call. It should be noted in this regard that using the original telephone number as a URI prefix allows the application 34 to identify a subject matter of the call. For instance, in the case where the organization is a department store with many different departments, a different telephone number may be registered within the registration server 20 for each department.

Upon selection of an agent 24, 26, the application 34 may redirect the call to the selected agent (e.g., 24) in such a way as to route messages between the agent and client through a buffer server 30. The application may do this in any of a number of ways. One way is to, in effect, transfer control of the call to an anonymity or buffer server.

As used herein, a buffer server is a server that functions to protect the anonymity of an agent from a client by substituting a source URL of the buffer server into any messages sent from the agent to the client. In effect, a buffer server is a processor (e.g., a router) that receives packets addressed to a first address and reroutes the packets to a second address based upon routing rules found within a memory of the buffer server.

The buffer server 30 functions to conceal the URL and any other identifying information of the agent 24, 26 from any serviced client 24, 26. The concealment of the URL of the agent 24, 26 from the client 14, 16 is performed to allow the organization to more effectively control agent utilization and to prevent clients 14, 16 from contacting agents directly without first contacting the organization (i.e., the host 22).

Transfer of control of the call to the buffer server 30 may be accomplished using any of a number of different methods. Under a first method, the INVITE 100 may be modified so as to appear to originate from the buffer server 30. Within the proxy server 32, the first line 102 of the INVITE 100 may modified to "agent24@host.com" and the domain name within second header 106 may be changed to "BUFFER-SERVER.com". The modified INVITE 100 may then be forwarded to the selected agent 24, 26. The modified INVITE 100 functions to set up a first leg of the communication path. The first leg of the communication path is set up between the agent 24 and the buffer server 30.

The proxy server 32 may also send a SIP instant message to the buffer server 30 that includes a copy of the original INVITE 100, an identifier of the agent, URL of the client (client14@phone.com) and the Call-ID of the INVITE. The instant message to the buffer server 30 may cause the buffer server 30 to set up the routing file for purposes of creating a second leg of the communication path between the buffer server 30 and client 14.

Within the buffer server 30, a connection processor 36 (again operating under CPL) may add the routing file to a routing table 38 that identifies a pair of URLs that define a communication path through the buffer server 30. In this regard, a first entry in a first set of entries may include the copy of the INVITE 100. A second entry may be a URL of the selected agent 24. A third entry (for this example) maybe may have the form "agent24@BUFFERSERVER.com" and a fourth entry may have the form "client14@BUFFERSERVER.com".

The third entry may be used to identify a communication port within the buffer server 30 for messages received from the selected agent 24. The fourth entry may identify a communication port within the buffer server 30 for messages received from the client 14. In operation, the third and fourth entries form a URL pair that the buffer serve 30 translates messages between.

Using the entries of the table 38, the buffer server 30 may set up a call between the selected agent 24 and the client 14. Upon receipt of the modified INVITE 100, the agent 36 may return a response message (i.e., "SIP/2.0 180 Ringing") to indicate processing of the call using the return path "client14@BUFFERSERVER.com". Upon receipt of the response, the connection processor 36 may use the source URL of the agent 24 "agent24@host.com" to identify the corresponding set of entries within the table 38 that corresponds to the call. Upon identifying the proper set of entries, the connection processor 36 may translate and forward the response message using the destination URL "client14@phone.com" and a source URL of "agent24@BUFFERSERVER.com".

The client 14 may return an "ACK SIP: agent24©BUFFERSERVER.com" to acknowledge completion of setup of a communication channel. Upon receipt by the buffer server 30, the connection processor 36 may substitute "agent24@host.com" for the destination URL and "client14@BUFFERSERVER.com" for the source URL and may forward the acknowledge message to the agent 24.

As an alternative to redirecting the INVITE 100 directly to the agent 24, the application 34 or proxy server 32 may send the INVITE 100 to a buffer server 30 along with an identifier of the selected agent 24. The INVITE 100 and identifier of the agent 24 may be forwarded to the buffer server 30 using an SIP instant messaging format or by encapsulating the INVITE and identifier using an appropriate tunneling protocol (e.g., PPP).

To set up the call under the alternate embodiment, the buffer server 30 may first translate the INVITE 100 for use with the buffer server 30. In this regard, the buffer server 30 may substitute the URL of the agent "agent24@host.com" for "+12345678910@proxy.com" in the first line 102 and "client14@BUFFERSERVER.com" for "client14@phone.com" in the From header 106 of FIG. 2. The buffer server 30 may then forward the modified INVITE 100 to the selected agent 24 and proceed as described above.

Once the communication connection has been set up, the agent 24 and client 14 may converse in a manner appropriate for the communication channel. Upon completion of the call, the agent 24 may terminate the call by transmitting a "BYE SIP:caller14@BUFFERSERVER.com" message that will be converted and forwarded to the client 14 as discussed above. The caller may respond with a "SIP/2.0 200 OK". Alternatively, the caller 12 may terminate the call with the exchange of a corresponding set of messages.

In order to allow for supervision of agents 24, 26, the buffer server 30 may initially set up each call between agents and clients as a two-party conference call under the control of a conferencing application 40. The conferencing application 40 allows a supervisor 23 to perform traditional monitoring or barge-in functions.

The conferencing application 40 may include a SIP user agent to handle signaling, an RTP mixer to handle media streams and a conference application layer for the authentication, authorization and accounting (AAA) service. The supervisor 23 may use a SIP REFER request to activate a first sub-program within the conference application 40 to request mixing of signals from agent 24 and client 14 and forwarding of the mixed signals to the supervisor 23 for purposes of monitoring the conversation between the agent 24 and client 14. Alternatively, the supervisor 23 may use a second SIP REFER request to the same or different sub-program to achieve full participation in the conversation.

In addition to setting up calls between clients 14, 16, and agents 24, 25, the agent selection application 34 may also function to monitor call progress. In this regard, the application 34 may send a SIP REGISTRATION request to each agent 24, 26 requesting notification of status. When a SIP BYE is exchanged between agent 24, 26 and client 14, 16, notification is returned to the application 34 notifying the application of the termination of the call. In this case, the application 34 functions to modify the agent list 31 by adding the agent 24, 26 to the list of available agents 24, 26.

In another embodiment, a client having a personal computer 16 may see an ad published by the organization for a widget with an offer of more information at the URI "widget@host.com". Using a user agent (UA) 17 on his PC 16, the client may enter the URI into a GUI interface of the UA 17. The client may also enter a choice of communication medium (e.g., instant messaging, VOIP, etc.).

In response, the user agent 17 may compose and forward an INVITE addressed to the host 22. Within the host 22, the INVITE may be delivered to the agent selection application 34. The agent selection application 34 may parse the INVITE and recognize the prefix of the URI as being intended for an agent 24, 26 qualified to answer question related to widgets and may process the INVITE accordingly.

In this regard, the agent selection application 34 may search for and select a qualified agent (e.g., 26) and may assign the call to the agent 26. To assign the call to the selected agent 26, the application 34 may send the INVITE 100 and identifier of the agent 26 to the buffer server 30. The buffer server 30 may form another set of entries in the table 38 and redirect the INVITE 100 to the agent 26 by changing the URI within the first line 102 to an URI of the agent 26 (e.g., "agent26@host.com"), as discussed above.

Upon receiving the INVITE, the agent 26 may negotiate a communication protocol. For example, if the client 16 had requested instant messaging, then the negotiated protocol may be instant messaging. Alternatively, if the requested protocol had been VOIP, then the negotiated protocol may be VOIP.

In either case, upon completion of setup of the communication link, the agent 26 may send an acknowledge message to the client 16 and the client 16 and agent 26 may begin conversing. Upon completion of the conversation, the link may be terminated as discussed above.

A specific embodiment of method and apparatus for distributing calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of routing a SIP call within an automatic contact distributor system wherein an initial SIP message of the SIP call from a caller is forwarded to the automatic contact distributor system via a first server, such method comprising the steps of:

selecting an agent of a plurality of agents of the automatic contact distributor system to handle the SIP call forwarded to the automatic contact distributor from the first server;

setting up the SIP call connection, between the selected agent of the automatic contact distributor system and a second server separate from the caller and the plurality of agents, so as to route any SIP messages between the agent and the caller through the second server different from the first server including the first server modifying the initial SIP message by changing an address of the first server to an address of the selected agent and changing a domain name of first server to a domain name of the second server, and forwarding the modified message to the selected agent;

modifying any source addresses of the SIP messages sent from the agent to the caller and received by the second server from the agent by substituting an address of the second server in SIP messages sent from the agent to the caller and forwarding the modified SIP messages to the caller thereby protecting anonymity of the agent from the caller by concealing URLs and any other identification information of the agent; and re-addressing SIP messages received from the caller at the second server and forwarding the re-addressed SIP messages to the agent.

2. The method of routing the SIP call as in claim 1 further comprising receiving a SIP INVITE from the caller by the automatic contact distributor system requesting a communication session with an agent of the automatic contact distributor system.

3. The method of routing the SIP call as in claim 2 further comprising determining a call type from the SIP INVITE.

4. The method of routing the SIP call as in claim 3 wherein the second server is a buffer server and the step of setting up the call further comprises forwarding the SIP INVITE to the buffer server along with an identifier of the selected agent and the buffer server substituting a source URL of the buffer server in SIP messages sent from the agent to the caller.

5. The method of routing the SIP call as in claim 4 wherein the step of setting up the call further comprises entering the SIP INVITE into a routing table within the buffer server along with the identifier of the selected agent.

6. The method of routing the SIP call as in claim 4 wherein the step of forwarding the SIP INVITE to the buffer server further comprises appending the identifier to a universal resource identifier of the buffer server within the SIP INVITE.

7. The method of routing the SIP call as in claim 4 wherein the step of forwarding the SIP INVITE to the buffer server further comprises encoding the SIP INVITE as an instant message.

8. The method of routing the SIP call as in claim 4 wherein the step of forwarding the SIP INVITE to the buffer server further comprises encoding the SIP INVITE with the identifier of the selected agent for forwarding using a tunneling protocol.

9. The method of routing the SIP call as in claim 1 further comprising modifying in the first server a SIP INVITE from the caller by inserting a URI of the automatic contact distributor system into the SIP INVITE and the first server forwarding the modified SIP INVITE to the automatic contact distributor system.

10. An apparatus for routing a SIP call within an automatic contact distributor system wherein an initial SIP message of the SIP call from a caller is forwarded to the automatic contact distribution system via first server, such apparatus comprising:

means for setting up the SIP call between a selected agent of a plurality of agents of the automatic contact distributor system and the caller so as to route any SIP messages between the agent and the caller through a buffer server different from the first server including the first server sending the initial SIP message to the buffer server with an identifier of the selected agent, and the buffer server modifying the initial SIP message and forwarding the modified message to the selected agent;

means for modifying any source addresses of the SIP messages sent from the agent to the caller and received by the buffer server from the agent by substituting a source URL of the buffer server in SIP messages sent from the agent to the caller and forwarding the modified SIP messages to the caller thereby protecting anonymity of the agent from the caller by concealing URL's and any other identifying information of the agent; and means for re-addressing SIP messages received from the caller by the buffer server and forwarding the re-addressed SIP messages to the agent.

11. The apparatus for routing the SIP call as in claim 10 further comprising means for receiving a SIP INVITE from the caller by the automatic contact distributor system requesting a communication session with an agent of the automatic contact distributor system.

12. The apparatus for routing the SIP call as in claim 11 further comprising means for determining a call type from the SIP INVITE.

13. The apparatus for routing the SIP call as in claim 12 further comprising means for selecting the agent based upon the determined call type.

14. The apparatus for routing the SIP call as in claim 13 wherein the means for setting up the call further comprises means for forwarding the SIP INVITE to the buffer server along with an identifier of the selected agent.

15. The apparatus for routing the SIP call as in claim 14 wherein the means for transferring control of the call further comprises means for entering the SIP INVITE into a routing table within the buffer server along the identifier of the selected agent.

16. The apparatus for routing the SIP call as in claim 14 wherein the means for forwarding the SIP INVITE to the buffer server further comprises means for appending the identifier to a universal resource identifier of the buffer server within the SIP INVITE.

17. The apparatus for routing the SIP call as in claim 14 wherein the means for forwarding the SIP INVITE to the buffer server further comprises means for encoding the SIP INVITE as an instant message.

18. The apparatus for routing the SIP call as in claim 14 wherein the means for forwarding the SIP INVITE to the buffer server further comprises means for encoding the SIP INVITE for forwarding using a tunneling protocol.

19. An apparatus for routing a SIP call within an automatic contact distributor system wherein an initial SIP message of the SIP call from a caller is forwarded to the automatic contact distributor system via a first server, such apparatus comprising:

a buffer server different from the first server adapted to set up the SIP call between a selected agent of the automatic contact distributor system and the caller so as to route any SIP messages between the agent and the caller through the buffer server;

a connection processor adapted to modify any source addresses of the SIP messages sent from the caller and received by the buffer server from the agent by substituting at the buffer server an address of the buffer server in SIP messages sent from the agent to the caller and the buffer server forming a URL pair for forwarding the modified SIP messages to the caller in response to a SIP instant message sent from the first server to the buffer server to cause the buffer server to create a communication path between the buffer server and the caller and protecting anonymity of the agent from the caller by concealing URL's and any other identification information of the agent, and to re-address SIP messages received from the caller at the buffer server and forward the re-addressed SIP messages to the agent.

20. The apparatus for routing the SIP call as in claim 19 further comprising a user agent within the automatic contact distributor system adapted to receive a SIP INVITE from the caller requesting a communication session with an agent of the automatic contact distributor system.

21. The apparatus for routing the SIP call as in claim 20 further comprising a call type processor adapted to determine a call type from the SIP INVITE.

22. The apparatus for routing the SIP call as in claim 21 further comprising an agent selection application adapted to select the agent based upon the determined call type.

23. The apparatus for routing the SIP call as in claim 21 further comprising a proxy server having an Internet connection that allows the proxy server to forward the SIP INVITE to the buffer server along with an identifier of the selected agent.

24. The apparatus for routing the SIP call as in claim 23 wherein the SIP INVITE forwarded to the buffer server further comprises the identifier of the selected agent appended to a universal resource identifier of the buffer server.

25. The apparatus for routing the SIP call as in claim 21 wherein the SIP INVITE forwarded to the buffer server further comprises an instant message.

26. The apparatus for routing the SIP call as in claim 21 wherein the SIP INVITE forwarded to the buffer server further comprises a message encoded using a tunneling protocol.

27. The apparatus for routing the SIP call as in claim 20 wherein the buffer server further comprises a routing table for re-addressing the SIP messages that are transferred between the agent and the caller.

* * * * *